(12) United States Patent
Pengilly

(10) Patent No.: US 6,746,356 B2
(45) Date of Patent: Jun. 8, 2004

(54) GEARED TRANSMISSIONS

(75) Inventor: Eric Alexander Pengilly, London (GB)

(73) Assignee: Trevor James Worrall, London (GB)

( * ) Notice: Subject to any disclaimer, the term of this patent is extended or adjusted under 35 U.S.C. 154(b) by 0 days.

(21) Appl. No.: 10/311,677

(22) PCT Filed: Jun. 15, 2001

(86) PCT No.: PCT/GB01/02667

§ 371 (c)(1), (2), (4) Date: Dec. 18, 2002

(87) PCT Pub. No.: WO01/98100

PCT Pub. Date: Dec. 27, 2001

(65) Prior Publication Data

US 2003/0176253 A1 Sep. 18, 2003

(30) Foreign Application Priority Data

Jun. 20, 2000 (GB) .............................. 0015115

(51) Int. Cl.$^7$ .............................................. F16H 48/06
(52) U.S. Cl. ............................................ 475/220; 74/410
(58) Field of Search .................. 475/220, 329, 475/343; 74/410, 411, 406, 412 R, 413

(56) References Cited

U.S. PATENT DOCUMENTS

| | | | |
|---|---|---|---|
| 1,514,522 A | * 11/1924 | Hilmes | ............ 74/410 |
| 2,895,342 A | 7/1959 | Hayhurst | |
| 3,036,475 A | 5/1962 | Haupt | |
| 3,064,490 A | 11/1962 | Sigg | |
| 3,772,934 A | 11/1973 | Warren | |
| 3,885,446 A | 5/1975 | Pengilly | |
| 3,889,549 A | 6/1975 | Fieuzal et al. | |
| 4,312,244 A | 1/1982 | Barnes et al. | |
| 4,790,210 A | 12/1988 | Muller et al. | |
| 4,876,908 A | 10/1989 | Pengilly | |
| 4,953,417 A | 9/1990 | Baumgarten et al. | |
| 5,896,775 A | 4/1999 | Southcott | |
| 6,035,956 A | 3/2000 | Maurer et al. | |

FOREIGN PATENT DOCUMENTS

| | | |
|---|---|---|
| EP | 0244263 | 11/1987 |
| EP | 0695889 | 11/1994 |
| GB | 660497 | 11/1951 |
| GB | 1338605 | 11/1973 |
| GB | 1434928 | 5/1976 |
| GB | 2151327 | 7/1985 |

* cited by examiner

Primary Examiner—Dirk Wright
(74) Attorney, Agent, or Firm—Dean W. Russell; Kilpatrick Stockton LLP

(57) ABSTRACT

A gear assembly (10) for transmitting torque between an input rotatable member (12) and an output rotatable member e.g. differential unit (24) comprises an input gear (14) rotatable with the input member (12), an output gear (20) rotatable with the output member (24), and intermediate gears (16a, 16b, 16c, 16d) held simultaneously in mesh with the input gear (14) and output gear (20). Various arrangements are disclosed for sharing the transmitted torque evenly between the paths provided by gears (16a, 16b, 16c, 16d). The transmission may provide a reduction ratio and is connected to a low reduction ratio differential gearbox of small size and slim profile.

12 Claims, 2 Drawing Sheets

GEARED TRANSMISSIONS

This application claims priority to Great Britain Patent Application No. 0015115.9 filed on Jun. 20, 2000 and International Application No. PCT/GB01/02667 filed on Jun. 15, 2001 and published as International Publication No. WO 01/98100 A1 on Dec. 27, 2001, the entire contents of which are hereby incorporated by reference.

This invention relates to transfer gearing for transmitting power between first and second members rotating about parallel axes in automotive transmissions, for example in which power from the output shaft of a main gearbox must be transmitted to a pair of propeller shafts respectively extending fore and aft of the vehicle. These propeller shafts are usually interconnected by differential gearing, and extend generally parallel to the main variable ratio gearbox output shaft. Typically, power is transmitted between a gear on the main gearbox output shaft and a similarly sized differential gear, to give an approximate 1:1 gear ratio. There are other instances where power must be transmitted from a first shaft to a second, generally parallel shaft in an automotive transmission.

In heavy vehicles such as trucks, this power transmission is often via an intermediate gear supported on a layshaft of a transfer gearbox. The diameter and/or lateral offset of the intermediate gear may be selected to provide the required centre spacing between the parallel shafts. Where a large centre spacing is required, the intermediate gear diameter must be made correspondingly large. As the maximum transmissible torque depends mainly upon the load per unit tooth width, the intermediate gear and the co-operating gears must each be made relatively wide for transmission of high torque loads.

High torque loads and large centre spacings thus lead to a large and heavy gear train between the main and transfer gearboxes. Large diameter gears have a higher pitch line velocity and hence tend to be noisier in operation than smaller gears.

For lighter 4×4 "sports utility" vehicles, such transfer boxes virtually all use chain drives for power transmission between the parallel shafts. The driveline must operate at high RPM and because of the necessary gear diameter/operating centre distances a conventional single power path geared drive as used in trucks, for example, would involve unacceptably large gears and pitch line velocities. At the speeds concerned, chain drive has proven quieter than even precision ground gears and allows a more compact casing. However chain drives suffer from overheating problems and excessive centrifugal loadings if used at speeds above about 6000 RPM. Their power transmission capacity is therefore limited.

Theoretically, an alternative design approach would be to provide a pair of intermediate gears offset to either side of the plane containing the parallel shaft axes, these intermediate gears each meshing simultaneously with corresponding gears on the parallel shafts (e.g. in the main and differential gearboxes respectively). Assuming that all four such gears are perfectly concentric, with perfect tooth pitches and profiles, supported on shafts perfectly spaced relative to one another, journalled in perfect, play-free bearings, the whole being made from perfectly inelastic materials, the transmitted torque will be shared equally between the two intermediate gears, to provide parallel torque transmission paths. The intermediate gears and the co-operating gears in the main and differential gearboxes could thus theoretically be made correspondingly smaller and lighter.

However, commercially manufactured gearboxes are not perfect. The kinematic forces acting on the intermediate gears coupled with the elasticity of the materials of the gear assemblies means that in reality one of the intermediate gears tends to be forced inwards towards the plane of the input/output shafts, whilst the other intermediate gear tends to be forced outwards away from that plane. The intermediate gear forced inwards experiences a higher torque than the intermediate gear forced outwards.

Furthermore, dimensional inaccuracies in the various gearbox components means that in reality one of the intermediate gears will, when torque is applied, assume flank-to-flank drive contact with each of the two adjacent gears, whilst at that instant the opposite intermediate gear has not established drive contact. Thus at that time only one torque transmission path is effective. As the torque load increases, provided that dimensional inaccuracies are within acceptable limits, gearbox components will deform under load until mutual drive contact is established between all adjacent gears. However, torque sharing between the two transmission paths will be unequal, with the degree of inequality corresponding to the size of the dimensional inaccuracies. The proportion of the torque transmitted through each path may vary throughout the rotation cycle of the gearbox assembly, as the dimensional inaccuracies of each gear may vary cyclically.

Studies by NASA on helicopter gearboxes (see paper by Timothy L; Krantz "A Method to Analyze and Optimize the Load Sharing of Split-Path Transmissions", published in Design Engineering, vol. 88, Power Transmission and Gearing Conference ASME 1996, at pages 227–242) have shown that satisfactory torque sharing between two parallel transmission paths can be achieved if tooth flank position errors are controlled to less than 0.0005 radian. Under these conditions, the inequality of torque transmission might not vary beyond, say, 60:40, leading to worthwhile savings in gearbox size and weight. Such dimensional accuracy is achievable, certainly in aerospace and similar specialist applications where high manufacturing costs are not prohibitive. However the requirement for high dimensional accuracy means that such torque sharing arrangements are impractical for mass produced automotive gearboxes, where low cost is an important factor.

U.S. Pat. No. 6,035,956 discloses an axle for low platform town buses in which hub reduction gear trains are connected, one on each side, between the axle differential and respective offset stub axles carrying the bus road wheels. Each transfer gear train comprises a pair of intermediate gears providing parallel power transmission paths. An input gear fixed to a respective output shaft of the differential meshes with both intermediate gears simultaneously and is vertically movable so as to share torque evenly between the power transmission paths.

U.S. Pat. No. 5,896,775 concerns high reduction final drive gearing for a powered scooter or wheelchair, in which an input shaft is connected to drive a pair of ground wheels through a pair of torque sharing pinion gears. The pinion gears engage a further gear wheel connected to drive the ground wheels. In one embodiment, the further gear wheel contains a differential arrangement.

It has now been realised that plural power path arrangements incorporating even torque sharing capability are of significant benefit to transfer gearing elsewhere in automotive transmissions, in particular between the main variable ratio gearbox and the axle (differential) drive, and also in other locations "up stream" of the axle differential.

In accordance with the invention there is provided an automotive transmission comprising a transfer gear train for transmitting torque between an input rotatable member and an output shaft rotating about substantially parallel axes, the transfer gear train comprising an input gear rotatable with the input member, an output gear rotatable with the output shaft, and a pair of intermediate gears each held simultaneously in mesh with the input gear and transmitting torque to the output gear to provide two power transmission paths, characterised in that the output shaft drives differential gearing arranged to distribute driving torque to a pair of ground engaging wheels. Preferably, one of the gears in the transfer train is made movable in response to the transmitted torque so as to even out power transmission between the two paths. However such torque sharing can also be achieved by other means, such as by controlling gear tooth flank position errors to within acceptably low limits.

The input gear is preferably made smaller than the output gear so that the transfer gear train provides a reduction ratio. The differential gearing may therefore have a lower reduction ratio, even substantially 1:1. This enables it to be made considerably smaller and lighter. Pitch line velocities in the transfer gearing and in the rest of the transmission driven by it are also reduced, giving quieter operation. The sizes of the gears in the transfer gear train and differential can be smaller than in a conventional single power path driveline, which much reduces gear weight (roughly proportional to diameter squared) and very much reduces gear moments of inertia (roughly proportional to diameter cubed).

In current driveline designs for passenger cars, the axle bevel gear has a large diameter, typically providing a reduction ratio of about 3:1—even larger for heavy vehicles. Any diminution in this reduction ratio increases gear loadings "up stream", including in the main gearbox and transfer gearbox (if present). Current driveline proportions therefore represent a trade off between minimum gearbox size and maximum acceptable axle ratio. The plural power path transfer gear train of the present invention provides a high capacity, compact power transfer path that can handle the higher torque loads arising from the use of low ratio axle differentials, and may itself be used to provide a reduction ratio, thereby reducing torque loadings on the main gearbox.

A smaller axle differential gives a greater ground clearance, which is important in off-road vehicles. Incorporating speed reduction in the transfer gear train also enables the overall reduction ratio of the transmission to be maintained, whilst using a smaller reduction ratio at the differential gearbox. This is beneficial in high performance vehicles such as racing cars, with engines operating at high RPM and which therefore require a high overall driveline reduction ratio. For such applications, the transfer gear train of the present invention again gives lower pitch line velocities and smaller, lighter, quieter, lower inertia differential gearboxes and final drivelines.

The two power paths enable the transfer gear train to be made smaller and lighter than a conventional transfer gearbox of equivalent duty. To facilitate assembly of the various gears in proper meshing engagement and to provide flexibility in the available gear ratios and in the centre spacing between the input and output members, a further intermediate gear is preferably provided in each power transmission path.

The torque responsive movement referred to above may for example be of the input gear. In one possible arrangement, the input shaft and the rotational axes of the co-operating intermediate gears all lie substantially in a common plane.

Where the various gears are spur gears, the input shaft may be made free to move (e.g. pivot) very slightly away from this plane. Then, when there is flank to flank contact between the teeth of the input gear and only one of the intermediate gears, the torque applied to the input shaft and the reaction at the contacting tooth flanks will form a couple causing the input shaft to move out of the common plane. This movement continues until there is flank to flank contact at the other intermediate gear as well. Even torque sharing between the two power transmission paths is therefore achieved.

Where the various gears are single helical gears, the input gear may be free to pivot about an axis normal to the common plane. Out-of-balance forces acting in the direction of the input shaft axis and arising from uneven torque sharing between the two power paths will rotate the input gear about the pivot axis in a direction tending to reduce the out-of-balance forces, and hence evening up the torque sharing. Operation of such a mechanism is more fully explained in GB 1434928. To reduce or substantially eliminate thrust loads on the gear shafts, the gears may be mounted to their shafts by helical splined connections, the helix being of the same hand and having the same lead as the gear teeth. The splined connection may itself allow the input gear to pivot about an axis passing through the input gear.

Similar arrangements are possible in which even torque sharing or compensation is provided by movement of the output gear.

The torque compensating gear may also be free to move slightly both in a direction normal to the common plane and/or along the axis of the input rotatable member, as described for example in relation to the output gears 24, 34 in EP 0244263. Another arrangement permitting such translational movements of a torque compensating gear is described below.

The invention in its various aspects, and its further preferred features, are described below with reference to illustrative embodiments shown in the drawings, wherein.

Figure 1:
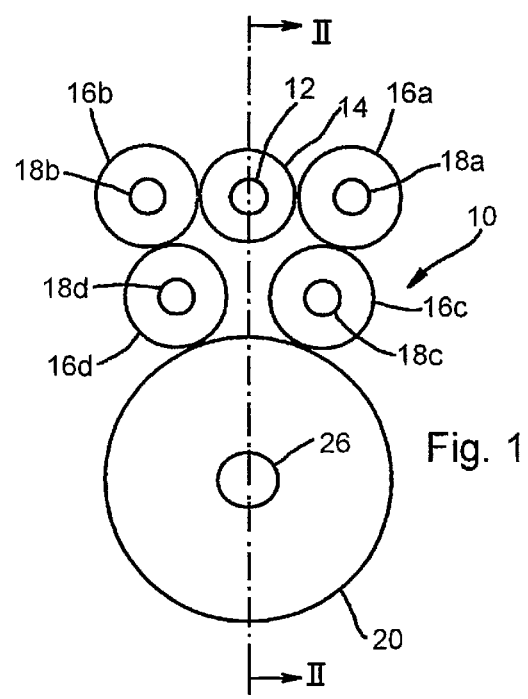
FIG. 1 is a diagrammatic front view of a transfer gear train embodying the invention.

Referring to FIG. 1, a transfer gear train 10 for an automotive transmission, comprises an input rotatable member in the form of an input shaft 12 connected to the output of a variable ratio main gearbox (not shown). Input shaft 12 carries an input gear 14 which meshes simultaneously with a pair of first intermediate gears 16a, 16b mounted on intermediate shafts 18a, 18b journalled in a gearbox casing (not shown). The intermediate gears. 16a, 16b mesh with respective further intermediate gears 16c, 16d mounted on shafts 18c, 18d. The further intermediate gears 16b, 16c mesh simultaneously with an output gear 20. In the drawings, the circles illustrate the pitch lines of the various gears shown. For simplicity, the gear teeth are not illustrated.

Figure 2:
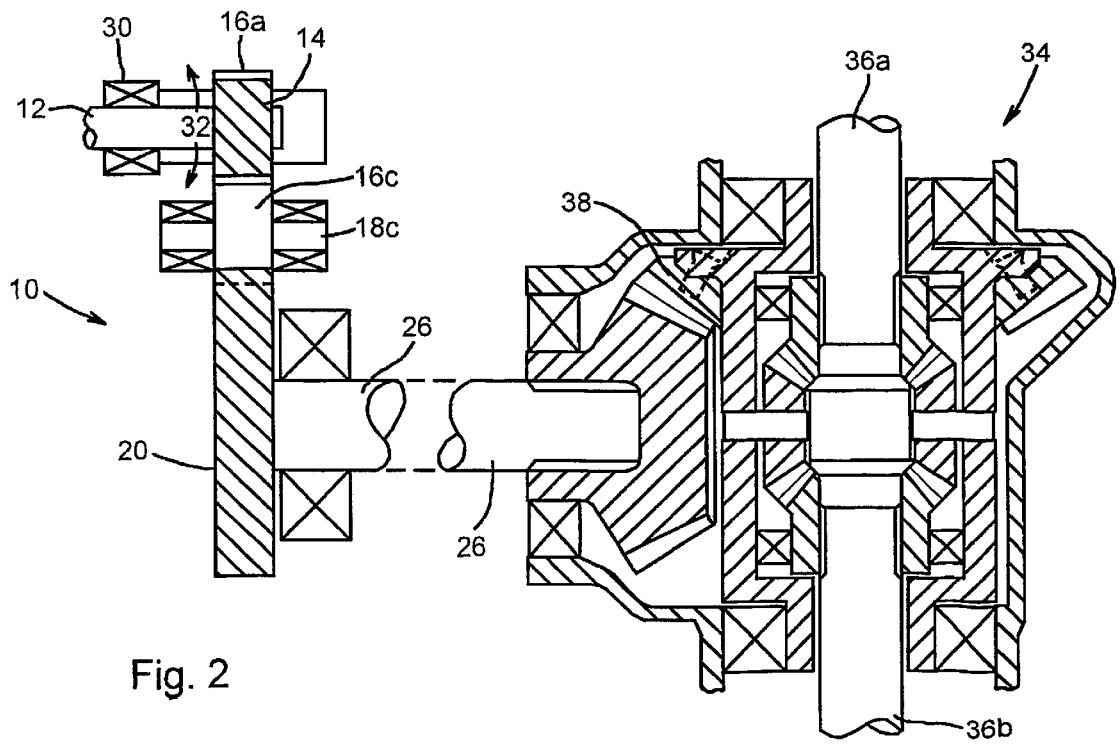
FIG. 2 is a diagrammatic sectional view of an automotive transmission incorporating the transfer gear train of FIG. 1.

As shown in FIG. 2, the output gear 20 is fixed to the input shaft 26 of an axle differential unit 34, having output shafts 36a, 36b for driving respective road wheels (not shown). The differential unit 34 may be of any known conventional kind, for example incorporating slip limiting or lockup means.

To provide even torque sharing between the parallel power paths constituted by the gears 16a, 16c on the one hand and 16b, 16d on the other, the input shaft 12 is mounted so that its end carrying the gear 14 is movable slightly out of the plane containing the shafts 18a, 18b. The bearings 30 may allow pivoting of the shaft 12 about an axis normal to the page (as indicated by the arrows 32) and the shaft 12 may incorporate a splined or other connection for this purpose. Such torque compensating movement is suitable for use with spur gears. If instead the gears 14, 16a, 16b, 16c, 16d are single helical, gear 14 may be mounted to the shaft 12 in the manner described in GB 1434928 to provide the necessary torque compensating movement. Similarly, if the various gears are double helical, mounted in "herringbone" configuration, torque compensation of the resulting compound gear 14 can be as disclosed in EP 0244263.

Figure 3:
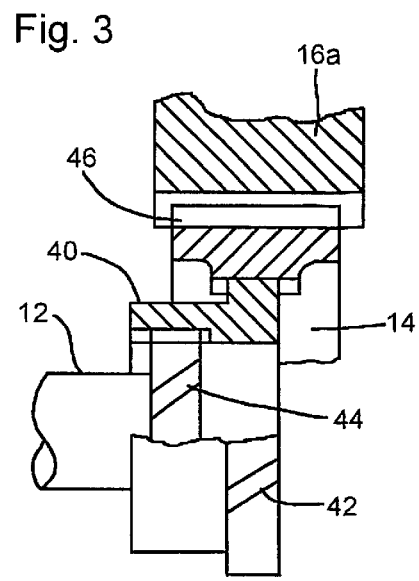
FIG. 3 is a diagram showing a mounting arrangement for a torque compensating single helical gear that may be used in embodiments of the invention.

FIG. 3 shows a further torque sharing arrangement for use with single helical gears. The compensating movement is provided by mounting gear 14 to shaft 12 via a torque transmitting sleeve 40. Gear 14 is formed as a ring gear having internal helical splines engaging complementary splines 42 on the sleeve 40. Internal helical splines on the sleeve in turn engage complementary splines 44 on the shaft 12. The splines 42, 44 are short and slightly crowned, to allow pivoting of the axes of shaft 12, sleeve 40 and gear 14 relative to each other. The lead and hand of the splines 42, 44 are equal to the lead and hand of the helical gear teeth 46. This ensures that axial forces on the sleeve 40 and gear 14, arising from the transmitted torque, balance out. With this arrangement, the gear 14 is not only free to pivot slightly out of the plane normal to the shaft 12, but can also translate slightly, both axially and normal to the plane passing through the axes of shafts 18a and 18b. This provides improved torque sharing with respect to the mechanism of GB 1434928.

Although in the drawings the torque sharing or compensation mechanism is shown applied to the input gear 14, it could equally be applied to an output or other gear meshing simultaneously with a pair of further gears, the shafts of all three gears being substantially co-planar. For example, the torque compensating movement may be of the output gear, particularly in transfer gear trains providing a step-up ratio.

As shown, the input gear 14 is smaller than the output gear 20. This therefore provides a reduction ratio. The reduction ratio of the final drive differential gearbox 34 may therefore be made smaller. A smaller bevel gear 38 may therefore be used. This results in a much slimmer gearbox 34, further reducing the weights and amounts of materials required, and improving the vehicle ground clearance. Large overall transmission speed reduction ratios may also be achieved, which can be advantageous in high performance vehicles such as Formula 1 Grand Prix racing cars. These currently use servo-operated, clutchless gearshifts, the gearbox having close ratios so as to eliminate the requirement for synchronisers. A large reduction ratio is needed in the transmission final drive. The main gearbox output shaft is close to the ground, so that the drive must be taken upwards to the rear wheels. The arrangement shown in FIG. 2 is suitable for such use. (For clarity, FIG. 2 shows the main transmission elements in co-planar configuration. When used in racing car transmissions, the gear train 10 may extend upwardly, i.e. the transfer gear train 10 is rotated from the position shown, relative to the axle differential 34, about the shaft 26, so as to place the shaft 12 at a lower level than the shaft 26).

A large centre spacing between the shafts 12, 26 is possible, whilst keeping the size of the gears 16a, 16b, 16c, 16d reasonably small. The transfer gearbox is accordingly compact, lightweight, quiet, efficient, has low inertia, and is capable of handling high shaft powers. Still further intermediate gears can be added into the power transmission paths, as desired.

It is also possible to eliminate the further intermediate gears 18c, 18d to produce a four gear arrangement in which the gears 18a, 18b mesh directly with gear 20 (the centres of gears 18a, 14 and 18b still being substantially in line to provide torque sharing). However, the gear ratios must then be carefully selected so as to achieve proper meshing of the gear teeth and so as to avoid clashing of gears 14 and 20. Only a limited number of gear ratios and offsets between shafts 12 and 26 are therefore available, which can be found e.g. by numerical means. Some examples are tabulated below.

| | Numbers of teeth | |
|---|---|---|
| Gear 14 | Gears 18a, 18b | Gear 20 |
| 5 | 13 | 23 |
| 5 | 19 | 29 |
| 5 | 25 | 35 |
| 5 | 41 | 31 |
| 5 | 37 | 47 |
| 5 | 43 | 53 |
| 5 | 49 | 59 |
| 5 | 55 | 65 |
| 5 | 61 | 71 |
| 5 | 67 | 77 |
| 5 | 73 | 83 |
| 5 | 79 | 89 |
| 5 | 85 | 95 |
| 10 | 20 | 40 |
| 10 | 32 | 52 |
| 10 | 44 | 64 |
| 10 | 56 | 76 |
| 10 | 68 | 88 |
| 10 | 80 | 100 |
| 10 | 92 | 112 |
| 10 | 104 | 124 |
| 10 | 116 | 136 |
| 10 | 128 | 148 |
| 10 | 140 | 160 |
| 10 | 152 | 172 |
| 10 | 164 | 184 |
| 10 | 176 | 196 |
| 15 | 27 | 57 |
| 15 | 33 | 63 |
| 15 | 45 | 75 |
| 15 | 51 | 81 |
| 15 | 63 | 93 |
| 15 | 69 | 99 |
| 15 | 81 | 111 |
| 15 | 87 | 117 |
| 15 | 99 | 129 |
| 15 | 105 | 135 |
| 15 | 117 | 147 |
| 15 | 123 | 153 |
| 15 | 135 | 165 |
| 15 | 141 | 171 |
| 15 | 153 | 183 |
| 15 | 159 | 189 |
| 15 | 171 | 201 |
| 15 | 177 | 207 |
| 15 | 189 | 219 |
| 15 | 195 | 225 |
| 15 | 207 | 237 |
| 15 | 213 | 243 |
| 15 | 225 | 255 |
| 15 | 231 | 261 |
| 15 | 243 | 273 |
| 15 | 249 | 279 |

-continued

Numbers of teeth

| Gear 14 | Gears 18a, 18b | Gear 20 |
|---|---|---|
| 15 | 261 | 291 |
| 15 | 267 | 297 |
| 30 | 72 | 132 |
| 30 | 108 | 168 |
| 30 | 120 | 180 |
| 30 | 144 | 204 |
| 30 | 156 | 216 |
| 30 | 180 | 240 |
| 30 | 192 | 252 |
| 30 | 216 | 276 |
| 30 | 228 | 288 |
| 30 | 252 | 312 |
| 30 | 264 | 324 |
| 30 | 288 | 348 |
| 30 | 300 | 360 |
| 30 | 324 | 384 |
| 30 | 336 | 390 |
| 30 | 360 | 414 |
| 30 | 372 | 432 |
| 30 | 396 | 456 |
| 30 | 408 | 468 |
| 30 | 432 | 492 |
| 30 | 444 | 504 |
| 30 | 468 | 528 |
| 30 | 480 | 540 |
| 30 | 504 | 564 |
| 30 | 516 | 576 |
| 30 | 84 | 144 |

Figure 4:
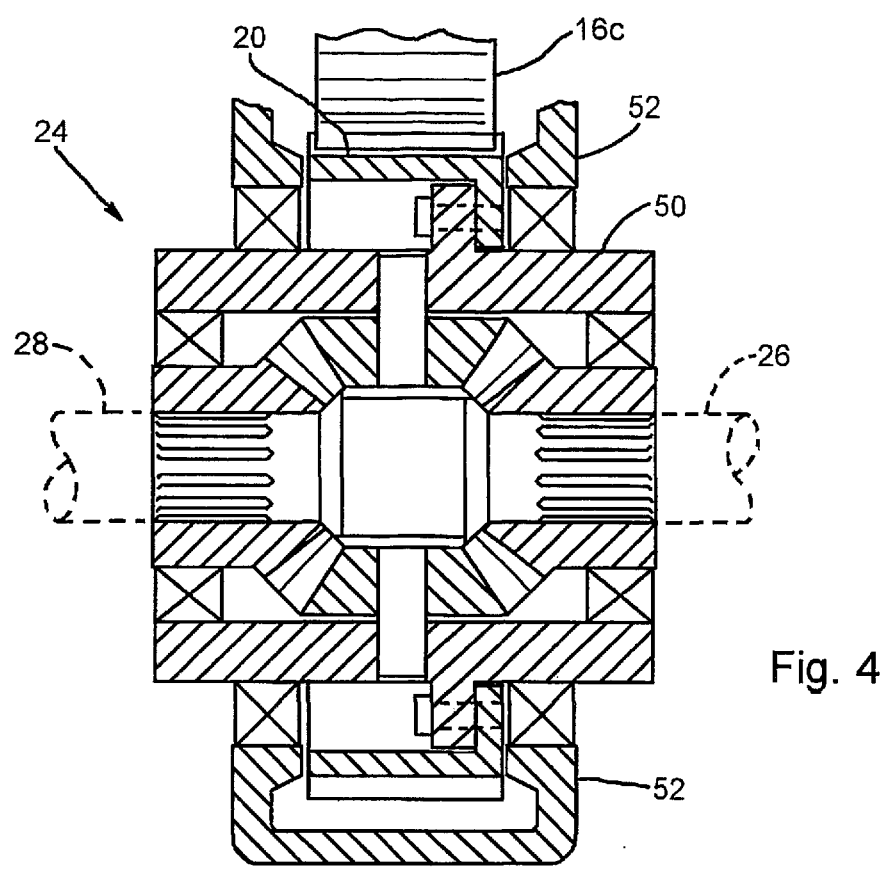
FIG. 4 is a diagrammatic section of a further differential unit which may be used in a modification of the FIG. 2 transmission for four wheel drive vehicles.

FIG. 4 shows a further differential unit 24 for use in four wheel drive (or higher) transmissions. Instead of being fixed directly to the shaft 26, the gear 20 is formed as a ring gear attached to a differential carrier 50 rotatable in a casing 52 of the differential unit 24. The shaft 26 forms one of the output shafts of the differential unit 24. A further output shaft 28 takes the drive to a further pair of vehicle road wheels (not shown), via a further axle differential unit (not shown), similar to unit 34. The transmission arrangement is otherwise similar to FIGS. 1 and 2, with the ring gear 20 engaged simultaneously by the gears 16c, 16d (only gear 16c is visible in FIG. 5; in "four gear" transfer train arrangements, ring gear 20 is of course engaged directly by gears 16a, 16b). The differential unit 24 splits the input torque equally between the output shafts 26, 28. Like the axle differential 34, it may incorporate conventional slip limiting and lock-up means. The transfer gear train 10 may be rotated about the shafts 26, 28, from the position shown, to any desired configuration.

Figure 5:
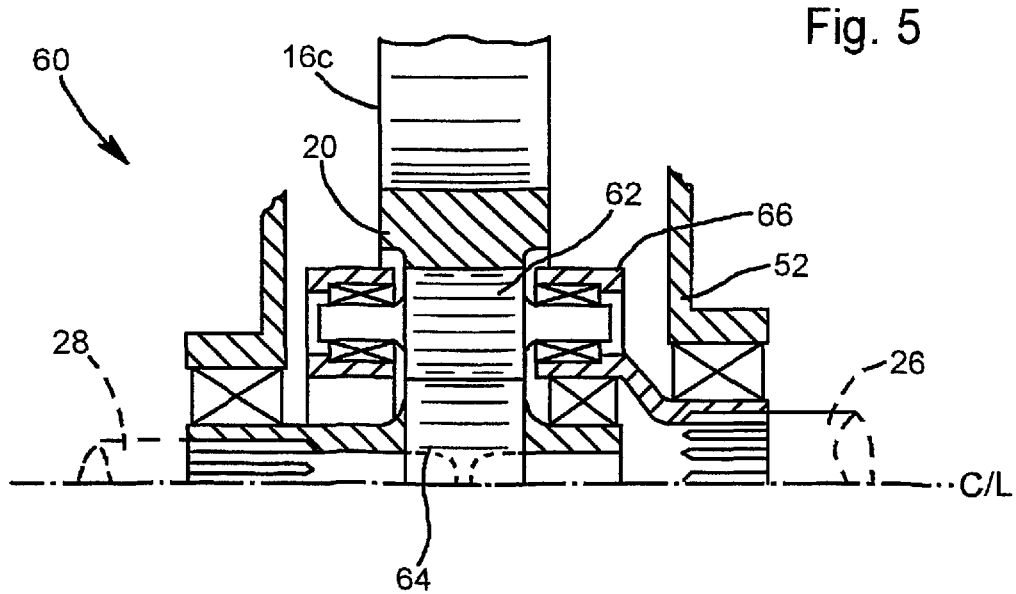
FIG. 5 is a diagrammatic section of a planetary differential unit which may be used in a further modification of the FIG. 2 transmission.

FIG. 5 shows a modification of the FIG. 4 arrangement, using a planetary differential 60. The ring gear 20 has external teeth for engagement by the gears 16c, 16d (or 16a, 16b) as in FIGS. 1, 2 and 4. It also has internal teeth engaged by a plurality of (e.g. three) planet gears 62, which in turn engage a sun gear 64. The gears 62 are journalled in a planet carrier 66, which drives one output shaft 26. The sun gear 64 drives the other output shaft 28. The planetary differential 60 provides an uneven torque split between the shafts 26: 28 in the ratio $$d_s + d_p/2 : d_s,$$

where $d_s$ is the diameter of the sun gear 64 and $d_p$ is the diameter of the planet gear 62. The differential 60 may be provided with otherwise conventional lock-up or slip limiting means, acting between the planet carrier 52 and sun gear 64.

What is claimed is:

1. An automotive transmission comprising a transfer gear train for transmitting torque between an input rotatable member and an output shaft rotating about substantially parallel axes, the transfer gear train comprising an input gear rotatable with the input member, an output gear rotatable with the output shaft, and a pair of intermediate gears each held simultaneously in mesh with the input gear and transmitting torque to the output gear to provide two power transmission paths; wherein the output shaft drives differential gearing arranged to distribute driving torque to a pair of ground engaging wheels.

2. The transmission of claim 1 wherein the input gear is smaller than the output gear.

3. The transmission of claim 1 wherein one of the gears in the transfer train is made movable in response to the transmitted torque so as to even out power transmission between the two paths.

4. The transmission of claim 3 wherein the torque responsive movement is of the input gear.

5. The transmission of claim 1 wherein a further intermediate gear is provided in each power transmission path.

6. The transmission of claim 1 wherein the rotational axis of one of the gears in the gear train which is movable in response to the transmitted torque so as to even out power transmission between the two paths, and the rotational axes of two other gears in the gear train which mesh simultaneously with the movable gear, all lie substantially in a common plane.

7. The transmission of claim 6 comprising spur gears wherein the shaft of the movable gear is free to move away from the common plane.

8. The transmission of claim 6 comprising single helical gears wherein the movable gear is free to pivot about an axis normal to the common plane.

9. The transmission of claim 8 wherein the movable gear is mounted to a shaft by a helically splined connection, the helix of the splines being of the same hand and having the same lead as the helix of the gear teeth.

10. The transmission of claim 6 wherein the movable gear is free to translate out of the common plane and/or along its rotational axis.

11. The transmission of claim 10 wherein the movable gear is mounted to the shaft via a torque transmitting sleeve, there being helically splined connections between the shaft and the sleeve and between the sleeve and the movable gear.

12. The transmission of claim 1 wherein one of said gears comprises two single helical gears mounted to a common shaft by helical splined connections, the common shaft being coupled to the input or output shaft by a drive connection that allows axial and radial displacement of the common shaft.

* * * * *